United States Patent [19]

Mullenberg

[11] 4,279,530
[45] Jul. 21, 1981

[54] FLANGED CONNECTION FOR SHAFTS OR TUBES

[76] Inventor: Ralph Mullenberg, Im Wiesengrunde 6, 4048 Grevenbroich 12, Fed. Rep. of Germany

[21] Appl. No.: 171,486

[22] Filed: Jul. 23, 1980

[30] Foreign Application Priority Data

Jul. 24, 1979 [DE] Fed. Rep. of Germany ... 7921137[U]

[51] Int. Cl.³ .............................................. F16D 1/00
[52] U.S. Cl. ...................................... 403/337; 403/370
[58] Field of Search ............... 403/336, 337, 335, 338, 403/297, 370

[56] References Cited

U.S. PATENT DOCUMENTS 3,603,626  9/1971  Whiteside ........................... 403/408
4,186,570  2/1980  Pokraudt ........................... 403/370 X
4,192,621  3/1980  Barth ................................ 403/337 X

*Primary Examiner*—Andrew V. Kundrat
*Attorney, Agent, or Firm*—Schwartz, Jeffery, Schwaab, Mack, Blumenthal & Koch

[57] ABSTRACT

A flanged connection for shafts or tubes includes abutting flanges at adjoining ends of the shafts or tubes and also includes aligned bores in the flanges. Fasteners extend through the bores in directions parallel to the axes of the shafts or tubes. The fasteners are radially expandable into clamped conditions in which they abut and exert radial pressure against the bores in the flanges. This eliminates the play between the two adjoining flanges, which play stems from necessary initial clearances between the fasteners and bores to allow for insertion of the fasteners into the bores.

3 Claims, 4 Drawing Figures

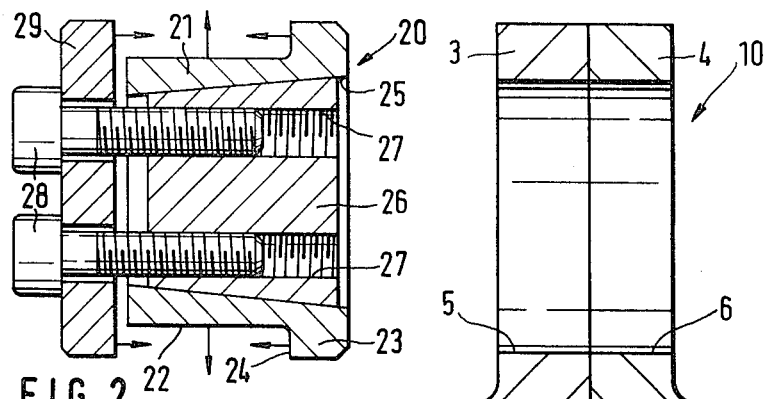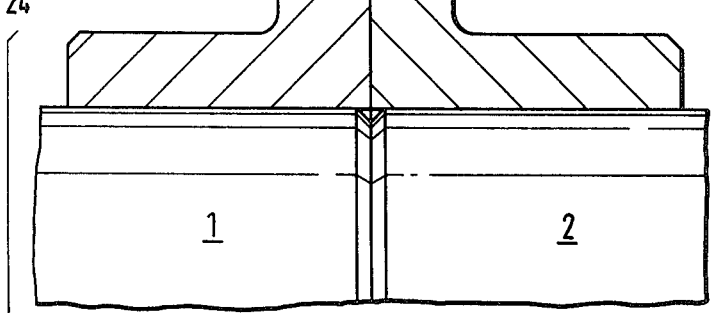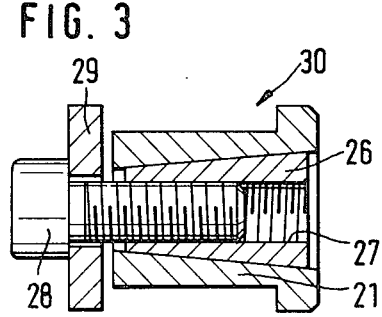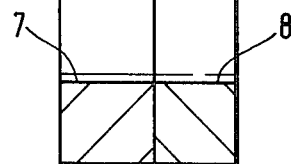

FLANGED CONNECTION FOR SHAFTS OR TUBES

TECHNICAL FIELD OF THE DISCLOSURE

The present invention concerns a flanged connection of the type in which a pair of radially extending flanges in abutting relationship are connected together by threaded bolts. In the type of connection to which the invention relates, each flange is connected with the end of an elongated member such as a shaft or tube. The threaded bolts are circumferentially spaced and extend parallel to the axis of the shaft or tube through mating aligned bores in the pair of flanges.

DESCRIPTION OF THE PRIOR ART

Connections of this type are often called upon to transmit large stresses, either torques or axial loads. They frequently have very large dimensions, and the threaded bolts used often have diameters of 10 to 20 cm. Considerable efforts have been expended in the past to insure against the freedom of play of such connections. Thus, it is known for example to thermally prestress the threaded bolts, i.e., to heat them, tighten them and allow them to cool, so that substantial thermal stresses will be superimposed on the stresses that may be generated by tightening (German Offenlegungschrift No. 27 24 737). Such heating, however, involves a significant expense, for example the arrangement of a heating element inside the threaded bolts.

SUMMARY

It is the object of the invention to make a flanged connection of the present type free of play in a simple manner.

This object is attained according to the invention by providing that the clearance between the bolt and flange bore, which clearance is required for the introduction of the threaded bolt into the corresponding bore of the flange, is eliminated during tightening. The object of the invention is further attained by providing that the threaded bolts fit into the bores under a radial stress, so that the clearance is eliminated. In this way, no deflection due to the foregoing initial clearances of the flanged connection is possible even under alternating stress.

More specifically, the connection of the present invention, for coupling together adjoining ends of elongated members, includes a pair of flanges, one flange extending radially outwardly away from the adjoining end of one elongated member, the other flange extending radially outwardly away from the adjoining end of the other elongated member. The flanges abut each other in face-to-face engaging relationship. The connection further includes a plurality of circumferentially spaced bores extending through the flanges in directions parallel to the longitudinal axes of the elongated members. All, or at least some, of the bores of one flange are aligned with the bores (or at least some of the bores) of the other flange to provide sets of aligned bores. The bores are defined by inwardly facing cylindrical surfaces. The connection also includes a plurality of fasteners, the fasteners having substantially solid cross sections. Each fastener extends through a set of aligned bores. Each fastener also includes means for effecting radial expansion thereof, the fasteners being expandable by the expansion means into clamped conditions in which they abut against the inwardly facing surfaces of the bore to exert radial pressure against the bore.

In the preferred exemplifying embodiment of the invention, the bolt or fastener is designed in the form of a releasable conical clamp bolt or fastener. More specifically, each bolt or fastener includes interfitting conical members, the expansion means including these interfitting conical members.

The releasability of the bolts in the present invention provides the further advantage that during its release the diameter of the bolt is somewhat reduced so that even a solidly corroded clamp bolt is loosened and that the problem of the freezing due to rusting, which is significant in the case of conventional bolts, is thus eliminated.

Details of the structural form of a preferred embodiment will now be summarized. In this regard, each bolt or fastener includes a barrel having an external surface approximately corresponding in diameter to the inwardly facing surfaces of the bores in the flanges. The barrel also has a collar at one end which extends radially outwardly of the external surface of the barrel. The barrel further includes an internal conical passageway therethrough which converges inwardly in a direction away from the collar. Each bolt or fastener further includes a conical plug disposed in the conical passage of the barrel. The conical plug has a threaded opening therein. The barrel and conical plug constitute the interfitting conical members. Each bolt and fastener additionally includes a disk having a diameter exceeding those of the bores in the flanges. The disk engages the barrel at the side of the barrel opposite the collar, and the disk has a hole therein. A lock screw passes through the hole in the disk to enter one side of the threaded opening in the conical plug and threadably engage the same. With this arrangement, advancement of the lock screw causes the conical plug to move axially in the conical passage of the barrel to, in turn, effect radial expansion of the barrel.

There is also an additional safety measure, whereby the loosening of the clamp bolts is prevented even under alternating stresses and at differential temperatures. In particular, a lock device threadably enters each threaded hole in the conical plug from a side of the conical plug opposite the side into which the lock screw enters. The locking device engages and locks the lock screw in the threaded hole.

BRIEF DESCRIPTION OF THE DRAWING

The drawing illustrates exemplary embodiments of the invention.

FIG. 1 shows a longitudinal section through a flanged connection;

FIGS. 2 and 3 show longitudinal sections through two embodiments of conical clamp bolts suitable for said flanged connections according to the present invention;

FIG. 4 shows a view of a lock nut or locking device.

DETAILED DESCRIPTION

It is the function of the clamping connection designated in its entirety by 10 to connect the abutting ends 1 and 2 of a shaft in a torsionally secure manner. The radial flanges 3 and 4 are positioned on the ends 1 and 2 of the shafts, the radial flanges being secured to the shaft ends 1, 2 in a suitable manner (not shown). The radial flanges 3, 4 abut against each other with their frontal surfaces. The radial flanges 3, 4 are provided with the bores 5, 6 and 7, 8. Two embodiments of conical clamp fasteners or bolts are shown, i.e., conical clamp fastener 20 of FIG. 2 and conical clamp fastener 30 of FIG. 3. Conical clamp bolts or fasteners 20 and 30, which effect the connection of the radial flanges 3, 4, are inserted, respectively, in the bores 5, 6 and in the bores 7, 8. In FIG. 1, the bores 5, 6 and 7, 8 have different diameters to indicate various forms of embodiment. It should be understood, however, that in actual practice generally round bores with equal diameters will be used.

The conical clamp fastener 20 (FIG. 2) comprises a flanged barrel 21 with a cylindrical part 22 approximately corresponding in diameter to the bores 5, 6 and a flange or collar 23 radially extending over said bores and arranged at the end that is to the right in FIG. 2 of the flanged barrel 21. The collar 23 abuts with its surface 24 against the right side of the radial flange 4 in FIG. 1. The flanged barrel 21 has a conical internal passage 25 which tapers inwardly, i.e., becomes narrower in a direction away from the collar 23. A conical plug 26, with a conical outer surface corresponding to conical internal bore 25, is seated in the internal passage 25. The conical plug contains 26 a plurality, for example, four, axially parallel threaded bores 27, which are entered by lock screws 28 on the sides of bores 27 away from the collar 23. The lock screws serve to tighten a disk 29 against the conical plug 26. The external diameter of the disk 29 exceeds the diameter of the bores 5, 6, exceeds the diameters of the cylindrical part 22 and exceeds the diameter of the collar 23. The disk 29 is intended to abut from the left, in FIG. 1, against the radial flange 3.

Upon tightening of the lock screws 28, the radial flanges 3, 4 are pressed together between the collar 23 and the disk 29. In the process, the conical plug 26 slides into the conical passage 25 of the flanged barrel 21 and expands the part 22 of the barrel 21 radially so that the part 22 will abut against the internal circumference of the bores 5, 6 under a radial stress. The radial flanges 3, 4 are thereby connected with each other with no clearance in either axial or radial directions. As a result of the essentially solid cross section which is thus created in the conical clamp fastener 20, the fastener 20 is capable of transmitting substantial shearing moments.

The cone angle of the internal passage 25 and of the conical plug 26 may be without or within the selflocking range. In the latter case, greater radial stressing forces may be obtained, but special measures must be taken to bring the conical plug 26 out of the flanged barrel 21, for example by applying the disk 29 from the right side in FIG. 2.

The conical lock bolt or fastener 30 of FIG. 3 corresponds to the conical clamp fastener 20 with the single difference that only one central lock screw is provided.

In order to prevent the loosening of the lock screws 28, a lock device or lock nut 9 may be screwed into the threaded bore 27, always from the right. An elastic washer 11 under the locking devices 9 will prevent the penetration of water into the threaded bores 27.

What is claimed is:

1. A connection for coupling elongated members together at adjoining ends of the members, each member having a longitudinal axis, the connection comprising:
    a pair of flanges, one flange extending radially from the adjoining end of one elongated member, the other flange extending radially from the adjoining end of the other elongated member, said flanges abutting each other in face-to-face engaging relationship;
    a plurality of circumferentially spaced bores extending through said flanges in directions parallel to the longitudinal axes of the elongated members, at least some of said bores of said one flange being aligned with at least some of said bores of said other flange to provide sets of aligned bores, said bores being defined by inwardly facing surfaces;
    a plurality of fasteners, said fasteners having substantially solid cross-sections, each fastener extending through a set of aligned bores, each fastener including means for effecting radial expansion thereof, said fasteners being expandable by said expansion means into clamped conditions in which they abut against the inwardly facing surfac e of said bores, each said fastener including interfitting conical members, said expansion means including said interfitting conical members, each said fastener including:
        a barrel having an external surface approximately corresponding in diameter to said inwardly facing surfaces of said bores; said barrel also having a collar at one end which extends radially outwardly of said external surface, said barrel further including an internal conical passage therethrough which converges inwardly in a direction away from said collar;
        a conical plug disposed in said conical passage, said conical plug having an opening therein, said barrel and conical plug constituting said interfitting conical members;
        a disk having a diameter exceeding those of said bores in said flanges, said disk engaging said barrel at a side of said barrel opposite said collar, said disk having a hole therein;
        a lock screw extending between said disk and said conical plug, said lock screw cooperating both with said hole in said disk and said opening in said conical plug to threadably couple said disk and said conical plug together;
        whereby advancement of said lock screw causes said conical plug to move axially in said conical passage of said barrel to, in turn, effect radial expansion of said barrel.

2. A connection as defined in claim 1, wherein said opening in said conical plug is a threaded opening and wherein said lock screw passes through said hole in said disk to enter one side of said threaded opening to threadably engage the same.

3. A connection as defined in claim 2, including a lock device threadably entering each threaded opening from a side thereof opposite said one side to engage and lock said screw in said threaded opening.

* * * * *